United States Patent [19]
Shatto

[11] 3,881,750
[45] May 6, 1975

[54] TRAILER HITCH

[76] Inventor: Merdith John Shatto, 3615 Brandon St. S.E., Calgary, Alberta, Canada, T2G 4A7

[22] Filed: Nov. 8, 1973

[21] Appl. No.: 413,893

[30] Foreign Application Priority Data
Aug. 14, 1973 Canada.................................. 178795

[52] U.S. Cl.............................. 280/423 R; 280/495
[51] Int. Cl............................................. B62d 53/00
[58] Field of Search.... 280/495, 496, 423 R, 423 A, 280/423 B

[56] References Cited
UNITED STATES PATENTS
3,722,917  3/1973  Mims............................ 280/495 X Primary Examiner—Robert R. Song
Attorney, Agent, or Firm—Burns, Doane, Swecker & Mathis

[57] ABSTRACT

A trailer hitch particularly adapted for the towing of goose-neck type trailers. The hitch consists of a frame that extends completely around the body of the towing vehicle from one side of the vehicle frame to the other and is secured at each end to the vehicle frame. The hitch is preferably positioned above or in front of the rear axle of the towing vehicle. The hitch is provided with a bearing to support the trailer.

3 Claims, 3 Drawing Figures

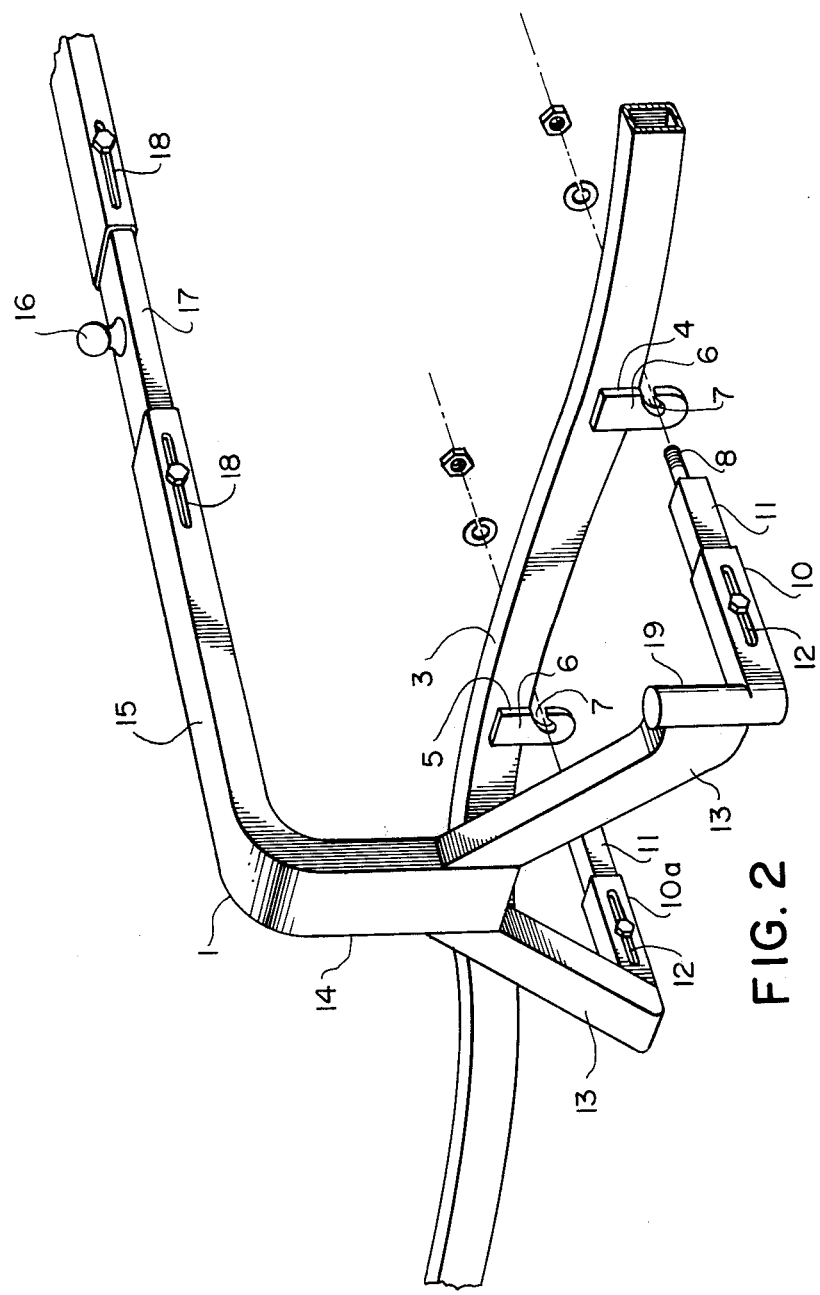

TRAILER HITCH

BACKGROUND OF THE INVENTION

1. Field of the Invention

The present invention relates to power vehicle drawn trailer systems and more specifically to a novel trailer hitch particularly suited for use in association with power vehicle drawn "goose neck" trailers.

2. Description of the Prior Art

One prior art system for towing a "goose neck" type trailer with an automobile is shown in U.S. Pat. No. 3,383,119 (Carroll) which shows a system that is adapted to be attached to the roof guttering of a car or truck. U.S. Pat. No. 3,692,332 (Pappatheodoru) illustrates another hitch adapted to be attached to the roof of a car by means of bolts or similar devices. U.S. Pat. No. 3,390,896 (Philapy) illustrates a trailer hitch adapted to be bolted or otherwise attached to the body of a truck or car. U.S. Pat. No. 2,628,106 (Sturwold) illustrates a method for attaching a trailer hitch for a goose neck-type trailer to the frame of an automobile. Sturwold's method requires substantial modification of the trunk and rear window areas of the automobile.

The advantages of a trailer hitch that places the weight of the trailer above or ahead of the rear axle of the towing vehicle are well known. They include increased stability and, if the weight is directly above the rear axle, the elimination of any effect on the loading of the front wheels. Even where it is impossible or impractical to position the weight of the trailer directly over the rear axle, increased stability results from positioning it closer to the rear axle, or between the rear and front axles. In addition, it is desirable that the hitch be attached to the frame of the towing vehicle for increased strength. The hitch should also desirably be simple to install and attractive in appearance. I know of no prior art system that accomplishes all these objectives.

SUMMARY OF THE INVENTION

The objects of this invention are to provide a trailer hitch that allows the weight of the towed vehicle to be positioned substantially over or close to the rear axle of the towing vehicle, or between the front and rear axles, thereby to obtain the advantages accruing from this positioning, and that can be attached to the frame of the towing vehicle in a simple and convenient manner, thereby providing a hitch that is attractive, strong, and easy to install.

The trailer hitch of my invention consists of a frame that is attached to both sides of the vehicle frame beneath the vehicle body and extends therefrom around the vehicle body from one side of the vehicle frame to the other, the hitch being provided with means for attachment to a trailer or other vehicle to be towed. In my preferred embodiment, the hitch is attached to the vehicle frame at points in front of and behind the rear axle of the vehicle and the point of attachment of the trailer to the hitch is positioned substantially above the mid-point of the rear axle of the vehicle.

THE DRAWINGS

FIG. 2 is a view in elevation of a portion of the trailer hitch of my invention together with a portion of the frame of a towing vehicle.

DESCRIPTION OF THE PREFERRED EMBODIMENT

The trailer hitch of my invention may be used with various types of towing vehicles, including trucks, but I will particularly describe it with respect to an automobile. The preferred embodiment of my trailer hitch is illustrated in the FIGS.

Figure 1:
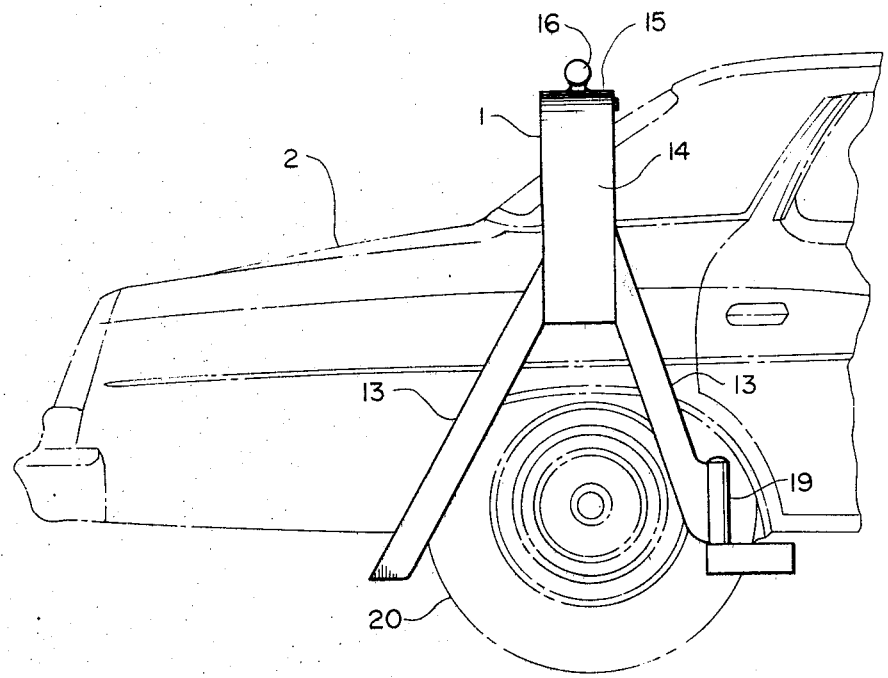
FIG. 1 is a view in elevation of a portion of an automobile to which a trailer hitch of my invention has been attached.

In FIG. 1, my trailer hitch 1 is shown attached to an automobile 2. The trailer hitch 1 is essentially a frame that extends around the body of the automobile and is attached to both lateral frame members of the automobile at points in front of and behind the rear axle.

Figure 3:
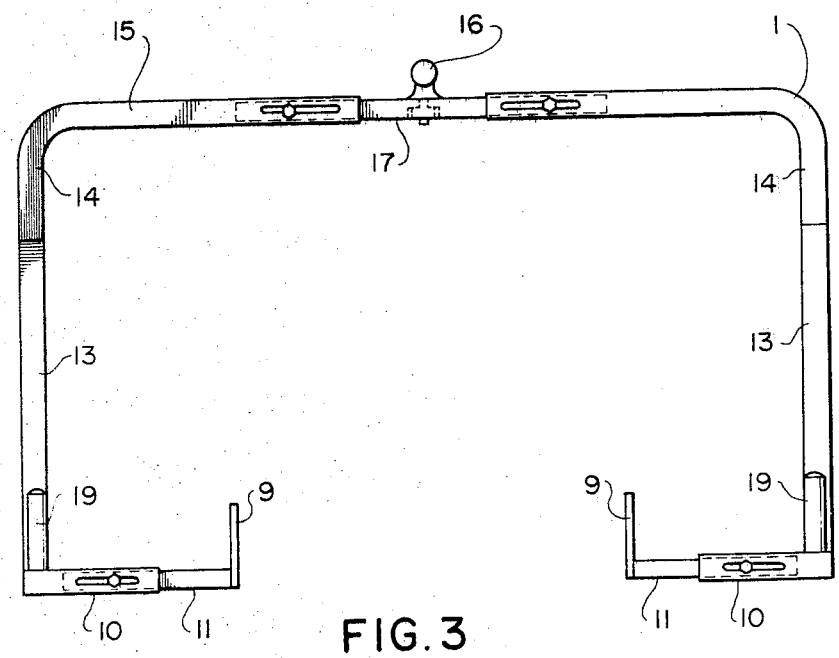
FIG. 3 is a plan view of an alternative embodiment of the trailer hitch of my invention.

In my preferred embodiment, as best shown in FIG. 2, each end of the hitch is attached to one of the lateral members 3 of the automobile frame at points 4 and 5 which are located, respectively, in front of, and behind the rear axle (not shown). Attachment of the hitch to the vehicle frame may be accomplished in many ways. In FIG. 2, the frame is attached to specially adapted members 6 that are welded to the automobile frame 3. The members 6 are provided with apertures 7 through which may be inserted bolts 8 which are threaded to accommodate nuts. An alternative attachment means is shown in FIG. 3, wherein plates 9 are welded to the hitch and may in turn be welded or bolted to the automobile frame.

From the points of attachment 4 and 5 to the automobile frame, horizontal arms 10 and 10a of the trailer hitch extend outwardly beyond the sides of the automobile body. In my preferred embodiment, the arms 10 and 10a are provided with means to adjust their length to accommodate the trailer hitch to any size of vehicle. Adjustment is provided by telescoped members 11 which are locked into the desired position by a channel and bolt arrangement 12. In my preferred embodiment, arms 10 and 10a are attached to upwardly extending arms 13 that are in turn attached to lateral members 14 of the hitch. The arms 13 and lateral member 14 cooperate to define a generally Y-shaped member. I have chosen this particular shape for my preferred embodiment because it provides structural strength, because it allows the arms 10 and 10a to clear the rear wheel and because it allows for access to the rear wheel. However, it will be appreciated that many other configurations are possible. For example, lateral member 14 could extend to a point below the lower edge of the automobile body and could then be attached to a transverse member, defining a generally T-shaped configuration, the ends of arms 10 and 10a being attached to the ends of the transverse member. Alternatively, arms 13 could meet at the end of the transverse member 15, eliminating entirely the need for lateral member 14. It will be appreciated that many other configurations are possible within the scope of my invention.

Indeed, the overall configuration of my hitch as seen in plan view could take the form of a curved arc instead of a rectangle. It could also assume many intermediate forms. The particular overall configuration of the hitch is not of the essence of this invention. What is important is that means be provided for attachment of the hitch to the frame in front of and behind the axle to provide structural strength, and that the point of attachment to the trailer to the hitch be positioned substantially above the vehicle axle to provide the advantages accruing to such a mode of attachment as described above. Referring again to the figures, members 14 curve sharply towards each other to define a horizontal frame member 15 that extends transversely over the top of the automobile body. The member 15 is provided with a spherical bearing device 16 to which the trailer is attached. Other bearing devices may be used for attachment to the trailer, e.g., a "fifth wheel" arrangement that is sometimes used for attachment of gooseneck trailers to trucks. In my preferred embodiment, means is provided to adjust the length of the transverse member 15. Adjustment is provided by telescoped members 17 which may be locked into the desired position by a channel and bolt arrangement, 18.

In my preferred embodiment, I provide a swivel 19 upon which is mounted the forward arm 10. In this way, arm 10 may be swivelled out of the way of the automobile wheel 20 when my hitch is positioned over the automobile body from the rear thereof, and the necessity to jack up the rear portion of the automobile and/or remove the wheels therefrom in order to permit the installation of my hitch may be avoided. Of course, there are many other ways to accomplish the same purpose. For example, the entire trailer hitch may be separated into two components by the temporary removal of member 17 and each of the components may be separately installed from either side of the vehicle.

It will be apparent from the above description that my trailer hitch confers substantial advantages over the prior art in that it may be securely attached to the frame of the towing vehicle with little difficulty, the point at which the weight of the trailer is born may be positioned at a point located substantially over or ahead of the rear axle of the towing vehicle, the hitch is esthetically pleasing in appearance, and its installation entails little, if any, modification to the structure of the towing vehicle. It is apparent that modifications in the design of my trailer hitch could adapt it for use in association with various types of towing vehicles, including automobiles and trucks. As has been discussed above, many variations are possible within the scope of my invention.

Although the preferred embodiment of my invention places the bearing portion of the hitch substantially over the rear axle of the vehicle, and places the points of attachment to the frame at points in front of and behind the rear axle of the vehicle, this position is not of the essence of my invention. For example, the hitch could be angled forward or backward so that the bearing point would be ahead of or behind the rear axle. These positions could be dictated by the shape of the vehicle body, or by design considerations. If the bearing point were behind the rear axle, this would result in some loss of stability, but it would still be an improvement over the position below and behind the rear bumper. Alternatively, particularly in the case of a truck or station wagon, the hitch could be positioned with both of its points of attachment in front of the rear axle and with the bearing point between the two axles. This positions the bearing point at a location close to that shown in Carroll and Pappatheodoru. If this point of attachment is employed, it is not necessary to have two separate members extending beneath the car body. Thus, the essential feature of my invention is simply a trailer hitch comprising a frame that extends around and beneath the body of the towing vehicle and is attached to the vehicle frame.

In the claims herein, the term "towing vehicle" refers to a powered vehicle having a generally rectangular frame typical of modern automobiles and trucks and having both front and rear axles with wheels mounted thereon.

I claim:
1. A trailer hitch for operable connection with a towing vehicle having a body, a frame and wheels connected to the frame, said hitch comprising:
    a first lateral frame member for extending generally upright on one side of the vehicle body and including first and second means connected to one end of said first lateral member for extending beneath the vehicle body for attaching said first lateral frame member to the frame of the vehicle at longitudinally spaced points on the vehilce frame;
    a second lateral frame member for extending generally upright on the other side of the vehicle body and including first and second means connected to one end of said second lateral frame member for extending beneath the vehicle body for attaching said second lateral frame member to the frame of the vehicle at longitudinally spaced points on the vehicle frame;
    transverse means interconnecting the other ends of said first and second lateral frame members and operably extending over a portion of the vehicle body;
    means carried by said transverse means for attachment to a trailer or other vehicle to be towed;
    at least one of said first and second means for extending beneath the vehicle body of said first lateral frame and said first and second means for extending beneath the vehicle body of said second lateral frame being provided with adjustment means for permitting lateral adjustment of at least one of said first and second lateral frame members with respect to the other of said first and second lateral frame members at said one of the ends thereof;
    means connected to said transverse means and at least one of the other ends of said first and second lateral frame members for permitting lateral adjustment of at least one of said first and second lateral frame members with respect to the other of said first and second lateral frame members at said other of the ends thereof; and
    means for pivotally connecting at least one of said first and second means connected to each of said first and second lateral frame members to a corresponding part of each of said first and second lateral frame members.

2. A trailer hitch for operable connection with a towing vehicle as defined in claim 1 wherein said first and second lateral frame members comprise:
    inverted Y-shape members and being connected to said vehicle frame at points located in front of and behind the rear axle of the vehicle wherein said means for attachment to a trailer is positioned substantially in a vertical plane intersecting the rear axle of the vehicle.

3. A trailer hitch for operable connection with a towing vehicle as defined in claim 2 wherein said means for pivotally connecting comprises:
    hinge means connected between the forward leg of said inverted Y-shaped member on each side of the vehicle and a corresponding lateral frame member for extending beneath the vehicle body.

* * * * *